["# United States Patent Office\n\n3,225,078\nPatented Dec. 21, 1965\n\n3,225,078\n2-(PHENOXY) ETHYL DIALLYLDITHIO-\nCARBAMATE\nAnton G. Weiss, Nitro, W. Va., and Philip C. Hamm,\nWebster Groves, Mo., assignors to Monsanto Company,\na corporation of Delaware\nNo Drawing. Original application Oct. 7, 1959, Ser. No.\n844,872, now Patent No. 3,142,693, dated July 28, 1964.\nDivided and this application Sept. 26, 1962, Ser. No.\n231,315\n3 Claims. (Cl. 260—455)\n\nThis is a division of application Serial No. 844,872 filed October 7, 1959, now U.S. Patent 3,142,693.\n\nThe present invention relates to new compounds and more particularly to aryloxyethyl esters of diallylthiocarbamic acids.\n\nThe compounds of the present invention may be represented by the general formula\n\n\n\nwhere R represents phenyl or halogen substituted phenyl, Y represents oxygen or sulfur, X and X' represent oxygen or sulfur at least one of which is sulfur and R' and R'' represent allyl or chloroallyl. Typical examples of the preferred compounds comprise 2-(phenylthio)ethyl, 2-(phenoxy)ethyl, 2-(p-chlorophenylthio)ethyl, 2-(p-chlorophenoxy)ethyl, 2-(p-bromophenylthio)ethyl, 2-(p-bromophenoxy)ethyl, 2-(2,4-dichlorophenylthio)ethyl, 2-(2,4-dibromophenylthio)ethyl, 2-(2,4-dichlorophenoxy)-ethyl, 2-(2,4-dibromophenoxy)ethyl, 2-(2,4,5-trichlorophenylthio)ethyl and 2-(2,4,5 - trichlorophenoxy)ethyl esters of diallyldithiocarbamic acid, diallylthiolcarbamic acid and diallylthionocarbamic acid.\n\nAlthough other methods of preparation are suitable, such thiocarbamates may be conveniently obtained by converting diallylamine to a thiocarbamic acid and condensing the diallylthiocarbamic acid with the halide containing the desired ether substituent. As an illustration of a satisfactory procedure, 23 grams (0.3 mole) of carbon bisulfide was added dropwise with stirring to 68 grams (0.7 mole) of diallylamine dissolved in 150 ml. of dimethyl formamide, the mixture being kept at 20–25° C. during the addition. Then 56 grams (0.3 mole) of p-chlorophenoxyethyl chloride was added in one portion and the mixture stirred for 5 hours at 60–70° C. After cooling to room temperature, 250 ml. of water were added to the product and the water solution extracted with 250 ml. of ether. The organic layer which separated was washed with 300 ml. of water and dried over sodium sulfate. The solvent was removed by stripping at 90–100° C. (14 mm. pressure). The 2-(p-chlorophenoxy)ethyl diallyldithiocarbamate, obtained in theory yield, was an amber oil analyzing 4.6% nitrogen, 10.9% chlorine and 19.8% sulfur as compared to 4.3% nitrogen, 10.8% chlorine and 19.6% sulfur calculated for $C_{15}H_{18}ClNOS_2$.\n\nEmploying the same reaction conditions and replacing the p-chlorophenoxyethyl chloride with an equimolar amount of the appropriate halide, further examples of the products of this invention were prepared possessing the following physical properties:\n\n2-(2,4-dichlorophenoxy)ethyl diallyldithiocarbamate, a dark amber oil, in 100% theory yield.\n\n2-(phenylthio)ethyl diallyldithiocarbamate, a dark amber oil, in 100% theory yield. Analysis gave 5.1% nitrogen and 31.4% sulfur compared to 4.5% nitrogen and 31.7% sulfur calculated for $C_{15}H_{19}NS_3$.\n\n2-(phenoxy)ethyl diallyldithiocarbamate, a dark amber oil, in 100% theory yield. Analysis gave 5.3% nitrogen and 22.6% sulfur compared to 4.8% nitrogen and 21.9% sulfur calculated for $C_{15}H_{19}NOS_2$.\n\nThe new compounds exert significant biological activity. In general they are efficient herbicides which combine grass and broadleaf activity. They are particularly effective in pre-emergent application. Amounts within the range of 1 to 60 pounds per acre are adequate for most purposes. The toxicants may be applied in the form of a spray containing the active ingredient in a concentration within the range of 0.05–5.0%. While the active components are insoluble in water they are soluble in common organic solvents. They may be dispersed directly in water or dissolved first in an organic solvent and then dispersed. As dispersing and wetting agents there may be employed soft or hard sodium or potassium soaps, alkylated aromatic sodium sulfonates such as sodium dodecybenzenesulfonate, or an amine salt thereof, alkali metal salts of sulfated fatty alcohols, ethylene oxide condensation products of alkyl phenols, tall oil, higher alcohols or higher mercaptans. The soid formulations or dusts may contain in addition to the active ingredient, diluents or extenders, preferably those which render the formulations permanently dry and free flowing. Effective solid diluents are clay, talc, pyrophyllite, silica and fuller's earth.\n\nAs illustrative of the herbicidal activity the ester was emusified in water and the emulsion applied as a spray. In this manner the active ingredient was applied to the soil of seeded plots before any plants emerged. About fourteen days after application of the toxicants results were observed and recorded. The number of seeds emerging was converted to weighted herbicidal ratings based on average percent germination of any particular seed lot times an injury factor. This evens irregularities of ratings on seeds which may vary in percent germination. The injury factor takes into consideration any plants not expected to survive. Thus, phytotoxicity ratings are based on the number of plants which emerge and will survive as observed two weeks after planting. Herbicidal ratings were assigned by means of the following conversion scale:\n\n| Percent emergence: | Phytotoxicity rating |\n|---|---|\n| 0–25 | 3 or severe. |\n| 26–50 | 2 or moderate. |\n| 51–75 | 1 or slight. |\n| 76–100 | 0 or none. |\n\nTable I illustrates the pre-emergent herbicidal activity of typical compounds. The active ingredient was applied at a dosage of 25 pounds per acre to the soil of seeded plots before the grass or other plants emerged:\n\nTABLE I\n\n| Active ingredient | Results observed |\n|---|---|\n| 2-(p-chlorophenoxy)ethyl diallyldithiocarbamate. | Severe phytotoxicity to radish and crab grass; moderate phytotoxicity to morning glory, sugar beet, foxtail, wild buckwheat, tomato and sorghum. |\n| 2-(2,4-dichlorophenoxy)ethyl diallyldithiocarbamate. | Severe phytotoxicity to morning glory, radish, sugar beet, foxtail, crab grass, pigweed, soybean and sorghum; moderate phytotoxicity to brome grass and tomato. |\n| 2-(2,4,5-Trichlorophenoxy)ethyl diallyldithiocarbamate. | Severe phytotoxicity to morning glory, radish, sugar beet, pigweed, tomato and sorghum; moderate phytotoxicity to wild oat, brome grass, foxtail, crab grass and wild buckwheat. |\n| 2-(phenoxy)ethyl diallyldithiocarbamate. | Severe phytotoxicity to wild oat and crab grass; moderate phytotoxicity to brome grass, sugar beet, soybean and tomato. |"]

It is intended to cover all changes and modifications of the examples of the invention herein chosen for purposes of disclosure which do not constitute departures from the spirit and scope of the invention.

What is claimed is:
1. 2-(p-chlorophenoxy)ethyl diallyldithiocarbamate.
2. 2-(p-chlorophenylthio)ethyl diallyldithiocarbamate.
3. 2-(2,4-dichlorophenoxy)ethyl diallyldithiocarbamate.

References Cited by the Examiner

UNITED STATES PATENTS

| | | | |
|---|---|---|---|
| 2,756,249 | 7/1956 | Kirsenbaum et al. | 260—455 |
| 2,992,091 | 7/1961 | Harman et al. | 260—455 |
| 3,055,751 | 9/1962 | Tilles et al. | 260—455 |
| 3,066,021 | 11/1962 | Beaver et al. | 260—455 |

CHARLES B. PARKER, *Primary Examiner.*

DANIEL D. HORWITZ, *Examiner.*